United States Patent [19]

Allison

[11] 3,820,357
[45] June 28, 1974

[54] UNIVERSAL JOINT
[75] Inventor: William D. Allison, Grosse Pointe Farms, Mich.
[73] Assignee: Ford Motor Company, Dearborn, Mich.
[22] Filed: Sept. 19, 1972
[21] Appl. No.: 290,304

[52] U.S. Cl............................ 64/23, 64/1 C, 64/8, 64/6
[51] Int. Cl............................................ F16d 3/06
[58] Field of Search............ 64/23 R, 8, 21 R, 1 C, 64/9 R, 9 A, 6; 287/58 CT, 58 R

[56] References Cited
UNITED STATES PATENTS
1,112,869  10/1914  Tirrell..................................... 64/8
1,120,510  12/1914  Landgrebe............................... 64/8
3,492,835   2/1970  Polizzotto.............................. 64/23

FOREIGN PATENTS OR APPLICATIONS
842,323  6/1937  France..................................... 64/8

Primary Examiner—Samuel Scott
Assistant Examiner—Randall Heald
Attorney, Agent, or Firm—Keith L. Zerschling; Clifford L. Sadler

[57] ABSTRACT

A universal joint constructed in accordance with one embodiment of the invention provides an operative connection between driving and driven tubular shafts of triangular cross section. A three corner intermediate member connected to the end of the smaller of the two shafts carries bearing means which slidably engage grooves formed in the interior of the other shaft. The joint accommodates angular and axial displacement between the two shafts.

8 Claims, 8 Drawing Figures

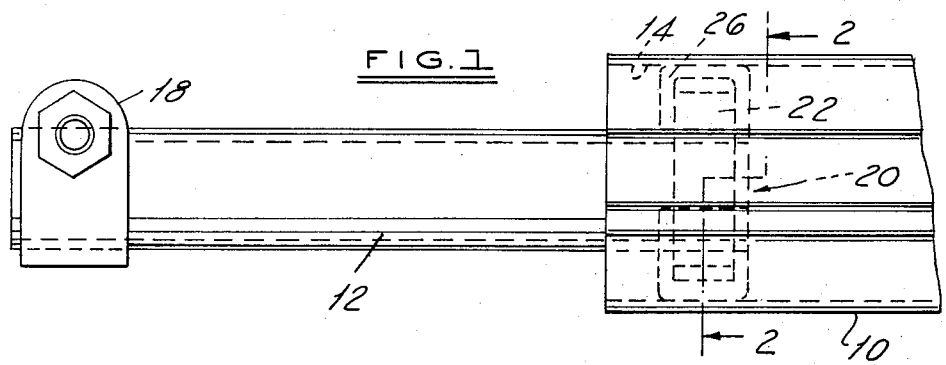
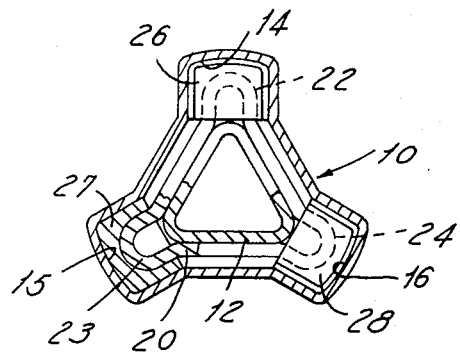
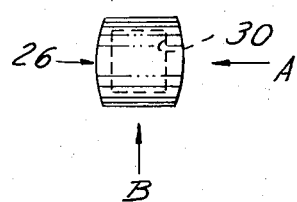
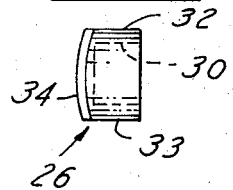
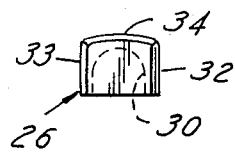
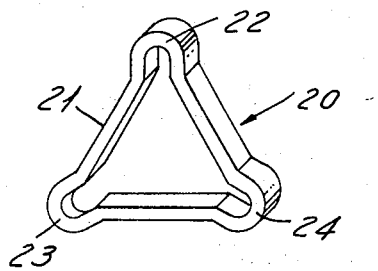

UNIVERSAL JOINT

BACKGROUND OF THE DISCLOSURE

There is a need in the art for a universal joint of lightweight, inexpensive construction which is characterized by its reliability of operation. The universal joint of the present invention is directed to that need.

BRIEF SUMMARY OF THE DISCLOSURE

In accordance with one of the presently preferred embodiments of this invention, a universal joint includes a pair of tubular shaft members of generally triangular cross sectional configuration. The shafts are of sheet metal construction with the larger shaft being formed to provide three longitudinally extending, bearing receiving integral grooves. An intermediate member of three corner shape is connected to the end of the smaller shaft. The intermediate member is formed of a band of sheet metal and is folded at its corners to provide outwardly extending, bearing receiving portions. Bearing cups are positioned on the three protruding corners of the intermediate member. The bearing cups slidably engage the internal grooves of the tubular first shaft.

A universal joint in accordance with this invention is constructed to accommodate angular misalignment between driving and driven shafts and, in addition, to accommodate axial displacement of one shaft with respect to the other shaft.

The principle components of a preferred universal joint are constructed of sheet metal with injection molded bearing caps. The joint, therefore, is inexpensive to manufacture and reliable in operation.

BRIEF DESCRIPTION OF THE DRAWINGS

The many objects and advantages of a universal joint constructed in accordance with the present invention will become apparent upon consideration of the following detailed discussion and the accompanying drawings, in which:

FIG. 1 is a side elevational view of a universal joint embodying one of the presently preferred forms of the invention;

FIG. 2 is a sectional view taken along section line 2—2 of FIG. 1;

FIG. 3 is a top plan view of the bearing cup of the universal joint shown in FIGS. 1 and 2;

FIG. 4 is a side elevational view of the bearing cup of FIG. 3 as seen from the direction of arrow A;

FIG. 5 is an end view of the bearing cup of FIG. 3 as seen from the direction of arrow B.

FIG. 6 is a perspective view of the intermediate member of FIGS. 1 and 2;

DETAILED DESCRIPTION OF A PREFERRED EMBODIMENT

Figure 7:
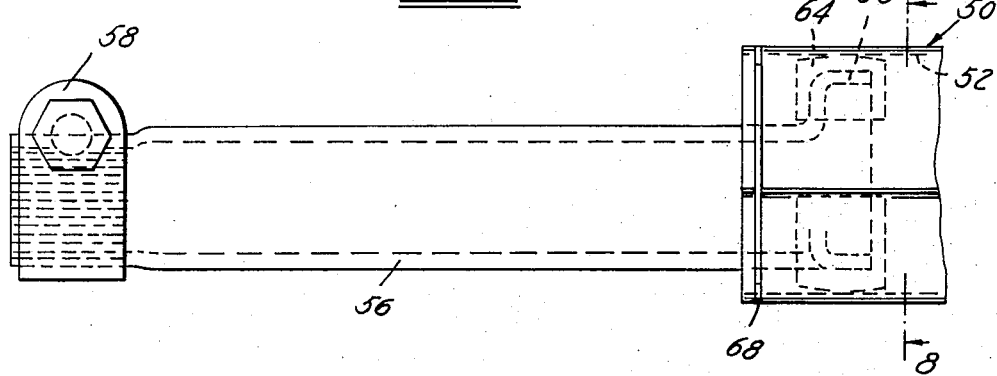
FIG. 7 is a side elevational view of an alternate embodiment of the invention.

Referring now to the drawings, wherein the presently preferred embodiment of this invention is illustrated, FIG. 1 discloses a unique universal joint construction. The universal joint of FIG. 1 includes a driving shaft 10 and a driven shaft 12.

The driving shaft 10 is of sheet metal construction and has a generally triangular configuration in cross section. The tube 10 is formed with three longitudinally extending internal grooves 14, 15 and 16.

The driven shaft 12 also has a generally triangular cross sectional configuration. It is smaller in dimension than the driving shaft 10 and is arranged to be telescopically received within the shaft 10. A clamp 18 is provided on the outer end of the shaft 12 for attachment to a third shaft as may be desired.

A three corner intermediate member 20, formed from a band of sheet metal, is secured to the inner end of the shaft 12. As seen in FIG. 6, the intermediate member 20 has a generally triangular body portion 21 and three U-shape corners 22, 23 and 24. The corners 22, 23 and 24 protrude outwardly and are constructed to extend into the grooves 14, 15 and 16 of the driving shaft 10.

Bearing caps 26, 27 and 28 are positioned on the outwardly extending corners 22, 23 and 24 of the intermediate member 20 and in sliding engagement with the walls of the grooves 14, 15 and 16. The bearing caps may be molded of plastic material such as nylon. Each cap has a cup shape configuration as shown in FIGS. 3, 4 and 5. The caps include a recessed interior 30 constructed to receive one of the U-shape corners 22, 23 or 24 of intermediate member 20. The bearing caps 26, 27 and 28 have flat sides 32 and 33 and an arched top 34 for engaging the three walls which define the grooves 14, 15 and 16.

OPERATION

The universal joint of FIG. 1 is assembled by securing the intermediate member 20 to the end of the shaft 12 by any appropriate means such as welding. The bearing caps 26, 27 and 28 are positioned on the outwardly extending corners 22, 23, 24 of the intermediate member 20. The driven shaft 12 is then inserted into the driving shaft 10 with the bearing caps in slidable engagement with the grooves 14, 15 and 16 of the shaft 10. Any appropriate device such as a snap ring may be positioned on the open end of the tubular driving shaft 10 to prevent the inadvertant withdrawal of the driven shaft 12.

In operation, the universal joint of FIG. 1 will accommodate angular displacement between the driving and driven shafts 10 and 12. With the bearing cups 26, 27 and 28 free to slide in the grooves 14, 15 and 16, it is apparent that the universal joint will accommodate axial displacement between the shaft members 10 and 12 as well as angular movement. The joint is of particular inexpensive construction because the shaft members 10 and 12 and the intermediate member 20 are of sheet metal construction and the bearing cups are preferably injection molded plastic members.

ALTERNATE EMBODIMENT

Figure 8:
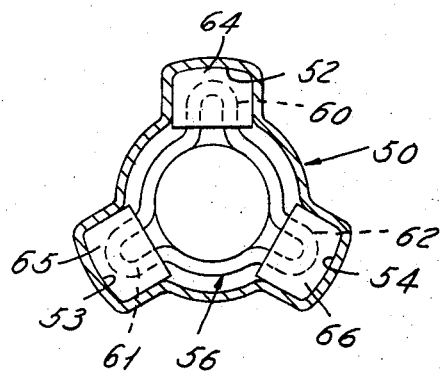
FIG. 8 is a sectional view taken along section lines 8—8 of the alternate embodiment of FIG. 7.

FIGS. 7 and 8 disclose an alternate embodiment of the present invention. In this embodiment, a driven shaft 50 is of tubular construction and is formed with three longitudinally extending, internal grooves 52, 53 and 54. A driven shaft 56 is also of tubular construction and has a circular cross section throughout the major portion of its length.

The outer end of the driven shaft 56 is provided with a clamp 58 for connecting it to a third shaft, if desired. The inner end of the driven shaft 58 is formed with integral outwardly extending ears 60, 61 and 62.

Bearing cups 64, 65 and 66 are positioned on the ears 60, 61 and 62. The bearing cups 64, 65 and 66 are in slidable engagement with the interior surfaces of the grooves 52, 53 and 54 of the driven shaft 50. A snap ring 68 may be provided on end of the driven shaft 50 to prevent the withdrawal of the inner end of the driven shaft 56.

In the embodiment of the invention of FIGS. 7 and 8, the bearing cups 64, 65 and 66 are identical in construction to the bearing cups 26, 27 and 28 of FIG. 2. In this embodiment, the inner end of the tube 56 is formed with integral bearing supporting ears 60, 61 and 62 rather than using a separate intermediate member as is the case with the FIG. 1 embodiment.

The universal joint of FIGS. 7 and 8 accommodates angular displacement between the driving and driven shafts 50 and 56 and, in addition, it accommodates axial displacement between the two shafts.

The foregoing description presents two of the presently preferred embodiments of this invention. Modifications and alterations may occur to those skilled in the art that will come within the scope and spirit of the following claims.

I claim:

1. A universal joint constructed to provide an operative connection between a driving shaft and a driven shaft,
   one of said shafts having circumferentially spaced apart bearing receiving portions,
   one end of the other of said shafts being dimensioned to be telescopically received within said one shaft,
   said one end of said other shaft being of thin wall tubular construction,
   said one end of said other shaft having integral outwardly extending bearing holding ears,
   said ears being circumferentially spaced apart,
   bearing means supported on each of said ears,
   said bearing means being received in said bearing receiving portions of said one shaft,
   said bearing means comprising a plurality of cup shape bearing caps.

2. A universal joint constructed to provide an operative connection between a driving shaft and a driven shaft,
   one of said shafts being of tubular construction and having a generally triangular body portion,
   said one shaft having circumferentially spaced apart internal bearing receiving portions,
   said internal bearing receiving portions comprising longitudinally extending internal grooves,
   the other of said shafts being of tubular construction and having a generally triangular body portion,
   both of said shafts being of thin wall sheet metal construction,
   said other shaft being dimensioned to be telescopically received within said one shaft,
   an intermediate member connected to one end of said other shaft,
   said intermediate member comprising a sheet metal band having a triangular body portion and three spaced apart outwardly extending corners,
   bearing means connected to each of said corners of said intermediate member,
   said bearing means comprising cup shape plastic bearing caps,
   said bearing means being received in said bearing receiving portions of said one shaft,
   said universal joint being constructed to accommodate both angular and axial displacement between said driving and driven shafts.

3. A universal joint constructed to provide an operative connection between a driving shaft and a driven shaft,
   both of said shafts being of thin wall sheet metal tubular construction,
   one of said shafts having channel portions defining circumferentially spaced apart and longitudinally extending internal grooves,
   the other of said shafts being dimensioned to be telescopically received within said one shaft,
   an intermediate member connected to one end of said other shaft,
   said intermediate member comprising a sheet metal band having a plurality of spaced apart outwardly extending corners,
   bearing means connected to each of said outwardly extending corners,
   said bearing means being slidably received in said grooves of said one shaft,
   said bearing means comprising cup shape plastic bearing caps,
   means affixed to one end of said one shaft and constructed to prevent the withdrawal of said one end of said other shaft from said one shaft,
   said universal joint providing an articulated connection constructed to accommodate both angular and axial displacement between said driving and said driven shafts.

4. A universal joint constructed to provide an operative connection between a driving shaft and a driven shaft,
   both of said shafts being of thin wall sheet metal tubular construction,
   one of said shafts having channel portions defining circumferentially spaced apart and longitudinally extending internal grooves,
   the other of said shafts being dimensioned to be telescopically received within said one shaft,
   integral outwardly extending bearing holding portions formed on one end of said other shaft,
   said bearing holding portions being circumferentially spaced apart,
   bearing means connected to each of said bearing holding portions,
   said bearing means being slidably received in said grooves of said one shaft,
   said bearing means comprising cup shape plastic bearing caps,
   means affixed to one end of said one shaft and constructed to prevent the withdrawal of said one end of said other shaft from said one shaft,
   said universal joint providing an ariculated connection constructed to accommodate both angular and axial displacement between said driving and said driven shafts.

5. A universal joint constructed to provide a driving connection between a first shaft and a second shaft,
   said first shaft having an interior portion with circumferentially spaced apart bearing receiving portions, one end of said second shaft being telescopically received within said interior portion of said first shaft, said one end of said second shaft having means constructed to provide outwardly extending bearing holding ears, said ears being circumferentially spaced apart, bearing means supported on each of said ears, said bearing means being received in said bearing receiving portions of said first shaft, said bearing means comprising a plurality of cup shape bearing caps.

6. A universal joint constructed to provide a driving connection between a first shaft and a second shaft, said first shaft being of tubular construction and having a generally triangular body portion, said first shaft having circumferentially spaced apart internal bearing receiving portions comprising three longitudinally extending internal grooves, said second shaft being telescopically received within said first shaft, an intermediate member connected to one end of said second shaft, said intermediate member having a generally triangular body portion and three spaced apart outwardly extending bearing supporting portions, a cup shape bearing cap supported on each of said bearing supporting portions, said bearing caps being slidably received in said bearing receiving portions of said first shaft, said universal joint being constructed to accommodate both angular and axial displacement between said first and second shafts.

7. A universal joint constructed to provide a driving connection between a first shaft and a second shaft, said first shaft having a tubular portion with circumferentially spaced apart and longitudinally extending internal grooves, said second shaft being telescopically received within said tubular portion of said first shaft, bearing support means rigid with one end of said second shaft and having a plurality of spaced apart outwardly extending ears, a cup shape bearing cap supported on each of said outwardly extending ears, said bearing caps being slidably received in said grooves of said first shaft, means affixed to one end of said first shaft and constructed to prevent the withdrawal of said one end of said second shaft from said first shaft, said universal joint being constructed to accommodate both angular and axial displacement between said first and second shafts.

8. A universal joint constructed to provide a driving connection between a first shaft and a second shaft, said shafts having telescopically related tubular end portions, said first shaft having means defining circumferentially spaced apart and longitudinally extending internal grooves, integral outwardly extending bearing support portions formed on one end of said second shaft, said bearing supporting portions being circumferentially spaced apart, a cup shape bearing cap supported on each of said bearing supporting portions, said bearing caps being slidably received in said grooves of said first shaft, said universal joint being constructed to accommodate both angular and axial displacement between said first and said second shafts.

* * * * *